Feb. 27, 1968    MITSUYOSHI IJICHI    3,370,726
MOTOR VEHICLE WITH DEVICE FOR LOADING
AND UNLOADING HEAVY CARGOS
Filed Dec. 23, 1965    2 Sheets-Sheet 1

Feb. 27, 1968  MITSUYOSHI IJICHI  3,370,726
MOTOR VEHICLE WITH DEVICE FOR LOADING
AND UNLOADING HEAVY CARGOS
Filed Dec. 23, 1965  2 Sheets-Sheet 2

# United States Patent Office 3,370,726
Patented Feb. 27, 1968

3,370,726
MOTOR VEHICLE WITH DEVICE FOR LOADING
AND UNLOADING HEAVY CARGOS
Mitsuyoshi Ijichi, Tokyo, Japan, assignor to Mitsubishi
Jukogyo Kabushiki Kaisha, Tokyo, Japan
Filed Dec. 23, 1965, Ser. No. 516,064
1 Claim. (Cl. 214—506)

ABSTRACT OF THE DISCLOSURE

In a motor vehicle comprising a drive for the vehicle, a chassis frame, a cabin and a load carrying platform secured on that portion of the chassis frame disposed to the rear of the cabin, the combination of telescopic hydraulic hoist means of a bridge type mounted just behind the cabin on the vehicle and capable of being driven by the same drive as drives the vehicle to lift the front end of the vehicle, including wheels, off the ground and simultaneously to tilt the entire vehicle with the rear down until the rear end of said load carrying platform approaches the ground surface on which the vehicle rests, a gangboard detachably connected between the rear end of said load carrying platform as tilted and the ground surface to provide an extension of said platform substantially flush with the upper surface of the latter, and winch means including a winch secured to said chassis frame on the rear portion, a pulley disposed adjacent said hoist means, and a length of cable operatively coupled to said winch and said pulley to be engageable by a heavy cargo to be loaded and unloaded.

---

This invention relates to a motor vehicle equipped with a device for loading and unloading heavy cargos.

Upon loading and unloading a heavy cargo on and from a motor truck respectively, a lifting machine for exclusive use with heavy cargos or any other equipment carried by the truck is generally employed. If the loading and unloading operations do not use such a machine, they will require such labor and auxiliary mechanical forces because the truck includes a load bearing platform high in weight. This results in a long operational time and also may be accompanied by a considerable danger.

Accordingly, it is an object of the invention to provide a motor vehicle having thereon an improved device for effecting loading and unloading of heavy cargos in a simple and safe manner within a short time interval, without the necessity of using any separate tilting machine.

It is another object of the invention to provide an improved motor vehicle including means for tilting the entire vehicle downwardly at the rear by its own power source until the rear end of a load carrying platform approaches the ground surface on which the vehicle rests, whereby a heavy cargo or cargos is or are loaded on and unloaded from the platform.

With the above cited objects in view, the invention provides a motor vehicle comprising a drive for the vehicle, a chassis frame, a cabin, a load carrying platform to the rear of the cabin secured to the chassis frame and telescopic hydraulic hoist means of a bridge type mounted on the chassis frame just behind the cabin and capable of being driven by the same drive as drives the vehicle to extend downwardly thereby to tilt the entire vehicle downwardly at the rear until the rear end of the load carrying platform approaches the ground on which the vehicle rests.

The invention will become more readily apparent from the following detailed description taken in conjunction with the accompanying drawings in which.

Figure 1:
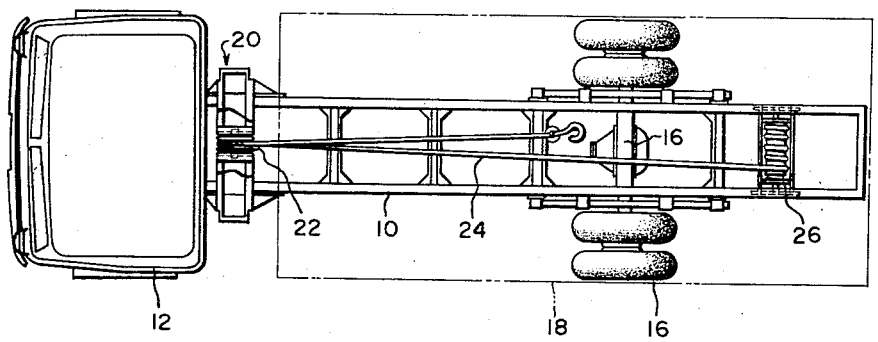
FIG. 1 is a plan view of a chassis of a motor vehicle embodying the principles of the invention.
Figure 2:
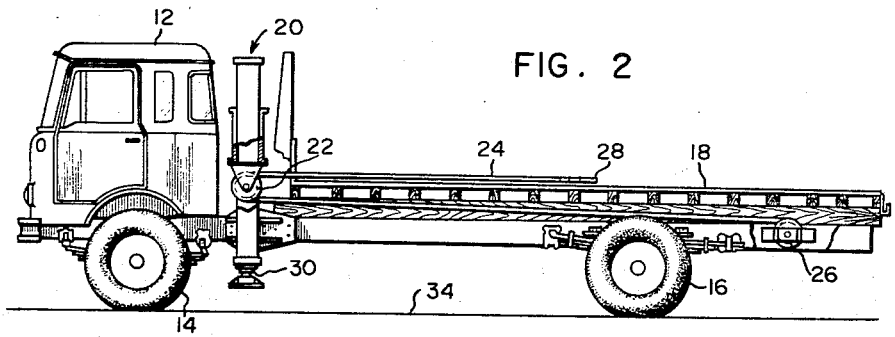
FIG. 2 is a side elevational view of the chassis illustrated in FIG. 1.

Referring now to the drawings and more particularly to FIGS. 1 and 2, there is illustrated a motor vehicle embodying the principles of the invention. The motor vehicle illustrated comprises a chassis frame 10, an operator's cabin 12 disposed on the front end portion of the chassis frame 10, front and rear wheels 14 and 16 respectively, and a rectangular platform 18 secured on the chassis frame to the rear of the cabin 12. The platform is designated by dot-and-dash line 18 in FIG. 1 and is adapted to have a heavy cargo or cargos carried thereon.

As best shown in FIG. 1, a pair of telescopic, hydraulic hoists 20 forming a bridge type hoist are vertically secured on both sides of the chassis frame 10 just behind the cabin 12. Disposed intermediate the pair of hoists 20 is a pulley 22 for guiding a wire or cable 24 operatively connected to a winch 26 which is, in turn, secured on that portion of the chassis frame 10 positioned to the rear of a rear axle 16' for the rear wheels 16. The cable 24 has its one end fixed to a drum for the winch 26 and passes around the guide pulley 22. The cable has secured at its other end a hook 28. The hook is adapted to engage a cargo to be loaded on and unloaded from the platform 18.

The hydraulic hoists 20 along with the winch 26 are adapted to be driven by a drive or an engine (not shown) on the vehicle for driving the latter. When driven, the hoists have the respective hoist columns 30 extended downwardly (see FIG. 3).

If a heavy cargo 32 (see FIG. 3) is to be loaded on the platform 18, then the pair of hydraulic hoists 20 are driven by the engine to cause the respective hoist columns 30 to be moved downwardly. After the hoist columns 30 have abutted against the ground surface designated by a horizontal line 34, a further downward movement of the hoist columns 30 cause the front end of the vehicle to be lifted about the axis of the rear axle 16' to tilt the entire vehicle with the rear down until the rear end of the load carrying platform 18 approaches the ground surface 34 (see FIG. 3).

Figure 3:
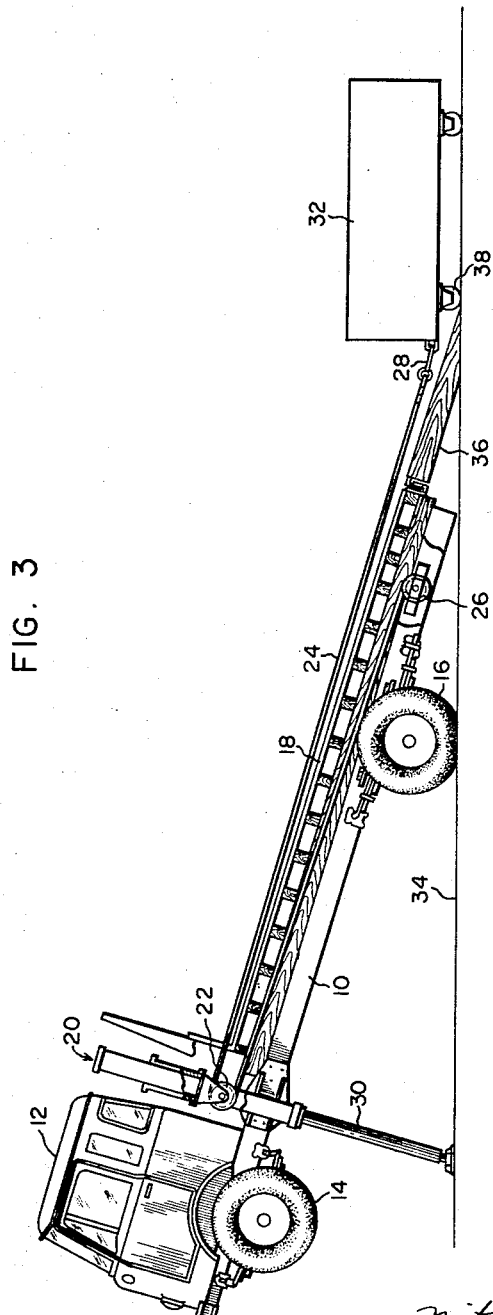
FIG. 3 is a side elevational view of the chassis illustrated in its operative position where the loading and unloading operations are performed.

As shown in FIG. 3, the gangboard 36 can be connected to the rear end of the platform 18 to provide an extension of the latter substantially flush with the upper surface of the platform and reaching the ground surface 34.

Under these circumstances, the hook 28 engages a cargo or container 32 and the winch 26 is driven by a drive or the engine. This causes the cable 24 to be wound up around the winch drum to draw the container connected to the cable 24 upon the load carrying platform 18 in an easy manner. If desired, a plurality of small wheels 38 or rolls may be provided on the container 32 to facilitate the loading operation.

After the completion of the loading operation, the pair of hoists 20 are returned to their original position to level the vehicle followed by disengagement of the hook 28 from the cargo 32.

If a cargo carried by the vehicle is to be unloaded, the latter is tilted in the same manner as above described in conjunction with the loading operation. Then the cargo will be naturally moved downwardly on the load carrying platform 18 by the action of the gravitational force exerted upon the cargo due to the tilting of the platform. Therefore, the cargo is preferably unloaded from the tilted platform while the winch 26 has a braking effect on the cargo. After the completion of the unloading operation the hoists are, of course, returned to their original state to level the vehicle.

From the foregoing, it will be appreciated that the objects of the invention have been accomplished by the provision of improved means for tilting the entire vehicle with the rear down.

While the invention has been illustrated and described in conjunction with a preferred embodiment thereof, it is to be understood that various changes in the details of construction and the arrangement and combination of parts can be made without departing from the spirit and scope of the invention.

What I claim is:

1. In a motor vehicle comprising a drive for the vehicle, a chassis frame, a cabin and a load carrying platform secured on that portion of the chassis frame disposed to the rear of the cabin, the combination of telescopic hydraulic hoist means of a bridge type mounted just behind the cabin on the vehicle and capable of being driven by the same drive as drive the vehicle to lift the front end of the vehicle, including wheels, off the ground and simultaneously to tilt the entire vehicle with the rear down until the rear end of said load carrying platform approaches the ground surface on which the vehicle rests, a gangboard detachably connected between the rear end of said load carrying platform as tilted and the ground surface to provide an extension of said platform substantially flush with the upper surface of the latter, and winch means including a winch secured to said chassis frame on the rear portion, a pulley disposed adjacent said hoist means, and a length of cable operatively coupled to said winch and said pulley to be engageable by a heavy cargo to be loaded and unloaded.

References Cited
UNITED STATES PATENTS

| 2,238,237 | 4/1941 | Thompson | 214—46.34 |
| 2,282,621 | 5/1942 | Thompson | 214—46.34 |
| 2,370,427 | 2/1945 | Sherry | 214—85 |
| 2,831,588 | 4/1958 | Seed. | |
| 3,066,816 | 12/1962 | Schwartz | 214—505 |

GERALD M. FORLENZA, *Primary Examiner.*

ALBERT J. MAKAY, *Examiner.*